United States Patent
Chaput et al.

(10) Patent No.: US 12,427,428 B2
(45) Date of Patent: Sep. 30, 2025

(54) DYNAMIC MODIFICATIONS OF SINGLE PLAYER AND MULTIPLAYER MODE IN A VIDEO GAME

(71) Applicant: Electronic Arts Inc., Redwood City, CA (US)

(72) Inventors: Harold Henry Chaput, Belmont, CA (US); Jesse Hans Stokes Harder, Redwood City, CA (US); Daniel Lee Kading, Edmonton (CA); John Christopher Epler, Edmonton (CA); John Kolen, Foster City, CA (US); Navid Aghdaie, San Jose, CA (US); Kazi Atif-Uz Zaman, Foster City, CA (US); Kenneth Alan Moss, Redwood City, CA (US); Thomas Murray Perlinski, Edmonton (CA); Graham Francis Scott, Edmonton (CA)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 18/601,602

(22) Filed: Mar. 11, 2024

(65) Prior Publication Data
US 2024/0293752 A1 Sep. 5, 2024

Related U.S. Application Data

(63) Continuation of application No. 17/653,799, filed on Mar. 7, 2022, now Pat. No. 11,925,872, which is a
(Continued)

(51) Int. Cl.
*A63F 13/795* (2014.01)
*A63F 13/335* (2014.01)
(Continued)

(52) U.S. Cl.
CPC .......... *A63F 13/795* (2014.09); *A63F 13/335* (2014.09); *A63F 13/47* (2014.09);
(Continued)

(58) Field of Classification Search
CPC .......... A63F 13/44; A63F 13/45; A63F 13/47; A63F 13/48; A63F 13/50; A63F 13/52;
(Continued)

(56) References Cited

U.S. PATENT DOCUMENTS

| 11,266,914 B2 | 3/2022 | Chaput et al. |
| 2014/0274371 A1 | 9/2014 | Helava et al. |

*Primary Examiner* — Omkar A Deodhar
(74) *Attorney, Agent, or Firm* — Knobbe, Martens, Olson & Bear, LLP

(57) ABSTRACT

A video game includes a single player mode where completion of storyline objectives advances the single player storyline. The video game also includes a multiplayer mode where a plurality of players can play on an instance of a multiplayer map. Storyline objectives from the single player mode are selected and made available for completion to players in the multiplayer mode, and the single player storylines can be advanced by players completing respective storyline objectives while playing in the multiplayer mode. Combinations of storyline objectives are selected from pending storyline objectives for players connecting to a multiplayer game for compatibility with multiplayer maps. Constraints can be used to determine compatibility.

20 Claims, 10 Drawing Sheets

Related U.S. Application Data continuation of application No. 16/824,473, filed on Mar. 19, 2020, now Pat. No. 11,266,914.

(60) Provisional application No. 62/824,211, filed on Mar. 26, 2019.

(51) Int. Cl.
*A63F 13/47* (2014.01)
*A63F 13/48* (2014.01)
*A63F 13/493* (2014.01)
*A63F 13/822* (2014.01)

(52) U.S. Cl.
CPC ............ *A63F 13/48* (2014.09); *A63F 13/493* (2014.09); *A63F 13/822* (2014.09)

(58) Field of Classification Search
CPC .......... A63F 13/55; A63F 13/56; A63F 13/58; A63F 13/70; A63F 13/795; A63F 13/822; A63F 13/847; A63F 13/87; A63F 2300/5566; A63F 2300/572; A63F 2300/63; A63F 2300/636
See application file for complete search history.

| Multiplayer Map No. | Name | Map Features Core | Map Features Swappable | Constraints Affirmative | Constraints Negative | Levels with Compatible Obj. | Compatible Objectives | Incompatible Objectives |
|---|---|---|---|---|---|---|---|---|
| 320 → | | | | | | 321 → | 323 → | 325 → |
| 1 | Valley | None | Ghosts, snakes | Outdoors, ... | No water-only units, ... | 1, 2, 3, 4, 5, x | Defeat wizards, defeat elves, ... | Defeat eels, ... |
| 2 | Castle | Rescue the Princess | Soldiers | Indoors, Large, ... | No water-only units, ... | 1, 2, 3, 4, 5, x | Defeat wizards, defeat elves, ... | Defeat eels, ... |
| 3 | Ocean | Sunken Treasure | | Underwater | No land-only units, ... | 1, x, 3, x, x, 6 | Defeat eels, find potions, ... | Defeat wizards, defeat elves, ... |
| 4 | Orc Land | Orcs | | Has Orcs, ... | No water-only units Elves too scared, ... | 1, 2, 3, 4, 5, x | Defeat orcs, defeat wizards, ... | Defeat elves, defeat eels, ... |
| 5 | Elf House | Elves | Wizards | Indoors, Small, ... | No water-only units No large units, ... | 1, 2, 3, 4, 5, x | Defeat elves, defeat wizards, ... | Defeat eels, slay dragon, ... |
| ... | ... | | | ... | ... | ... | ... | |

FIG. 3B

| Storyline Level Combinations | Multiplayer Map Compatability | Objective Combinations (level-objective) | Compatibility | Compatible Maps | Constraints | | | |
|---|---|---|---|---|---|---|---|---|
| | | | | | Lore | Storyline | Map | Other |
| 1, 1, 1, 1 | Compatible with 1, 2, 4, 5 | 1-1; 1-2 | ✓ | 1, 2, 4 | ✓ | ✓ | ✓ | ✓ |
| | | 1-1, 1-3 | ✓ | 2, 4, 5 | ✓ | ✓ | ✓ | ✓ |
| | | 1-2, 1-3 | /// no /// | //// none //// | /// no /// | /// no /// | ✓ | /// no /// |
| | | ... | ... | ... | ... | ... | ... | ... |
| | Incompatible with 3, 6 | 1-1; 1-2 | //// no //// | //// none //// | ✓ | ✓ | ✓ | ✓ |
| | | 1-1, 1-3 | //// no //// | //// none //// | /// no /// | /// no /// | ✓ | ✓ |
| | | 1-2, 1-3 | //// no //// | //// none //// | ✓ | /// no /// | /// no /// | /// no /// |
| | | ... | ... | ... | ... | ... | ... | ... |
| 1, 1, 1, 2 | //////// none //////// | 1-1; 1-2 | //// no //// | //// none //// | ✓ | ✓ | ✓ | ✓ |
| | | 1-1; 2-2 | //// no //// | //// none //// | ✓ | ✓ | ✓ | ✓ |
| | | 1-3; 2-2 | //// no //// | //// none //// | | | | |
| ... | ... | ... | ... | ... | ... | ... | ... | ... |
| N, N, N, N | Compatible with 3 | N-1; N-2 | ✓ | 3 | ✓ | ✓ | ✓ | ✓ |
| | | N-1; N-3 | ✓ | 3 | ✓ | ✓ | ✓ | ✓ |
| | | N-2; N-3 | ✓ | 3 | ✓ | ✓ | ✓ | ✓ |
| | | ... | ... | ... | | | | |
| | Incompatible with 1, 2, 4, 5, 6 | N-1; N-2 | //// no //// | //// none //// | ... | ... | ... | ... |
| | | N-1; N-3 | //// no //// | //// none //// | ... | ... | ... | ... |
| | | N-2; N-3 | //// no //// | //// none //// | ... | ... | ... | ... |

FIG. 6

DYNAMIC MODIFICATIONS OF SINGLE PLAYER AND MULTIPLAYER MODE IN A VIDEO GAME

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

FIELD

This disclosure relates generally to video games and developer environments for creating video games.

BACKGROUND

Video games can have different gameplay modes, such as a single player storyline mode and a multiplayer mode. Single player storylines may feature a sequence of objectives for players to complete while playing in the single player storyline mode to progress the single player storyline. Multiplayer modes often feature a different set of multiplayer objectives that can be completed while playing in the multiplayer mode.

SUMMARY OF CERTAIN EMBODIMENTS

Some aspects relate to a computer system for providing services for a video game, the computer system comprising: a memory, one or more data stores including computer-readable instructions, and one or more processors configured to execute the computer-readable instructions to perform operations. The operations include: receiving a first request for a first player to play in a multiplayer mode of the video game; determining that the first player has progressed to a first part of a single player storyline in a single player mode of the video game, wherein completion of one or more first storyline objectives advances the single player storyline for the first player; receiving a second request for a second player to play in the multiplayer mode of the video game; determining that the second player has progressed to a second part of the single player storyline in the single player mode of the video game, wherein completion of one or more second storyline objectives advances the single player storyline for the second player; determining a compatibility of a first objective from among the one or more first storyline objectives and a second objective from among the one or more second storyline objectives with a multiplayer map, wherein the multiplayer map is one of a plurality of multiplayer maps available in the multiplayer mode; based at least in part on determining the compatibility, instantiating, in the memory, an instance of the multiplayer map for the first player and the second player to play the multiplayer mode in; assigning the first player to complete the first objective while playing in the multiplayer mode; and assigning the second player to complete the second objective while playing in the multiplayer mode.

The computer system can have one, all, or any combination of the following features. The one or more processors configured to perform operations further comprising: based at least in part in response to determining the compatibility of the first objective and the second objective with the multiplayer map, configuring the multiplayer map such that in-game mechanics allow for the first player to complete the first objective and for the second player to complete the second objective within the multiplayer map as configured. The one or more processors configured to execute the computer-readable instructions to perform operations further comprising: determining a combination of storyline objectives that is compatible with the multiplayer map and includes storyline objectives from respective single player storyline objectives presently available to a largest number of respective players who will be joining the instance of the multiplayer map, wherein the first objective and the second objective are part of the combination of storyline objectives. The one or more processors configured to execute the computer-readable instructions to perform steps further comprising: assigning a multiplayer objective to the first player and to the second player, wherein a completion of the multiplayer objective is determined based at least in part on a competition among or cooperation action between a plurality of players in the multiplayer mode. The one or more processors configured to execute the computer-readable instructions to perform operations further comprising: determining that the first objective and the second objective are simultaneously compatible with the multiplayer map based at least in part on: a first constraint associated with the first objective; a second constraint associated with the second objective; and a third constraint associated with the multiplayer map. Determining that the at least the first objective and the second objective are simultaneously compatible with the multiplayer map is performed using at least one of: a directed search or a compatibility database. The one or more processors configured to execute the computer-readable instructions to perform operations further comprising: advancing a progress of the first player in the single player mode based on the first player completing the first objective in the instance of the multiplayer map.

Some aspects feature a computer-readable medium storing computer-readable instructions that, when executed by a computer system, cause the computer system to: execute a video game playable in at least a single player mode and a multiplayer mode, wherein the single player mode includes a plurality of objectives that can be completed to advance a single player storyline, and wherein the multiplayer mode is played by at least two players; receive a first request for a first player to play in the multiplayer mode of the video game; determine that the first player has progressed to a first part of the single player storyline in the single player mode, wherein completion of one or more first storyline objectives by the first player advances the single player storyline for the first player, wherein a second player has progressed to a second part of the single player storyline in another instance in the single player mode, and wherein completion of the one or more second storyline objectives by the second player advances the single player storyline for the second player; access an instance of a multiplayer map where the first player can interact in the video game with the second player, the multiplayer map being determined as compatible with a first objective selected from among the one or more first storyline objectives and with a second objective selected from among the one or more second storyline objectives; receive an assignment of the first objective to be completed by the first player while playing in the multiplayer mode, wherein the second player is assigned to complete the second objective while playing in the multiplayer mode; determine that the first player has completed the first objective in the instance of the multiplayer map; and advance a progress of the first player in the single player mode based on the first player completing the first objective in the instance of the multiplayer map.

The computer-readable medium can have one, all, or any combination of the following features. The multiplayer map is configured such that in-game mechanics allow for the first player to complete the first objective and for the second player to complete the second objective; and configuring the in-game mechanics to allow for the first player to complete the first objective includes swapping a first element in the multiplayer map with a second element that is related to the first objective, wherein the first element is unrelated to the first objective. The computer-readable instructions further cause the computer system to: determine a combination of storyline objectives that is compatible with the multiplayer map and includes storyline objectives from respective single player storyline objectives presently available to a largest number of respective players who will be joining the instance of the multiplayer map, wherein the first objective and the second objective are part of the combination of storyline objectives. The computer-readable instructions further cause the computer system to: receive a multiplayer objective assigned to the first player and to the second player, wherein a completion of the multiplayer objective is determined based at least in part on a competition among or cooperation action between a plurality of players in the multiplayer mode. The first objective and the second objective are simultaneously determined to be compatible with the multiplayer map based at least in part on: a first constraint associated with the first objective; a second constraint associated with the second objective; and a third constraint associated with the multiplayer map. The computer-readable instructions further cause the computer system to: advance a progress of the first player in the single player mode based on the first player completing the first objective in the instance of the multiplayer map.

Some aspects feature a computer-implemented method comprising: receiving a first request for a first player to play in a multiplayer mode of a video game; determining that the first player has progressed to a first part of a single player storyline in a single player mode of the video game, wherein completion of one or more first storyline objectives advances the single player storyline for the first player; receiving a second request for a second player to play in the multiplayer mode of the video game; determining that the second player has progressed to a second part of the single player storyline in the single player mode of the video game, wherein completion of one or more second storyline objectives advances the single player storyline for the second player; determining a compatibility of a first objective from among the one or more first storyline objectives and a second objective from among the one or more second storyline objectives with a multiplayer map; based at least in part on determining the compatibility, instantiating an instance of the multiplayer map for the first player and the second player to play the multiplayer mode in; advancing a progress of the first player in the single player mode based on the first player completing the first objective in the instance of the multiplayer map; and advancing a progress of the second player in the single player mode based on the second player completing the second objective in the instance of the multiplayer map.

The computer-implemented method can have one, all, or any combination of the following features. The computer-implemented method can further include: based at least in part in response to determine the compatibility of the first objective and the second objective with the multiplayer map, configuring the multiplayer map such that in-game mechanics allow for the first player to complete the first objective and for the second player to complete the second objective, wherein configuring the multiplayer map includes adding an element to the instance of the multiplayer map, the element being related to the first objective, and wherein the multiplayer map does not include the element by default. The computer-implemented method can further include: determining a combination of storyline objectives that is compatible with the multiplayer map and includes storyline objectives from respective single player storyline objectives presently available to a largest number of respective players who will be joining the instance of the multiplayer map, wherein the first objective and the second objective are part of the combination of storyline objectives. The computer-implemented method can further include: assigning a multiplayer objective to the first player and to the second player, wherein a completion of the multiplayer objective is determined based at least in part on a competition among or cooperation action between a plurality of players in the multiplayer mode. The computer-implemented method can further include: determining that the first objective and the second objective are simultaneously compatible with the multiplayer map based at least in part on: a first constraint associated with the first objective; a second constraint associated with the second objective; and a third constraint associated with the multiplayer map. Determining that the at least the first objective and the second objective are simultaneously compatible with the multiplayer map is performed using at least one of: a directed search or a compatibility database. The computer-implemented method can further include: assigning the first player to complete the first objective while playing in the multiplayer mode; and assigning the second player to complete the second objective while playing in the multiplayer mode.

BRIEF DESCRIPTION OF THE DRAWINGS

FIG. 3B illustrates a table of example multiplayer maps and related metadata.

FIG. 6 illustrates an example user interface showing compatibilities of multiplayer maps with different combinations of levels and storyline objectives from a single player storyline mode.

DETAILED DESCRIPTION

Introduction

Figure 1:
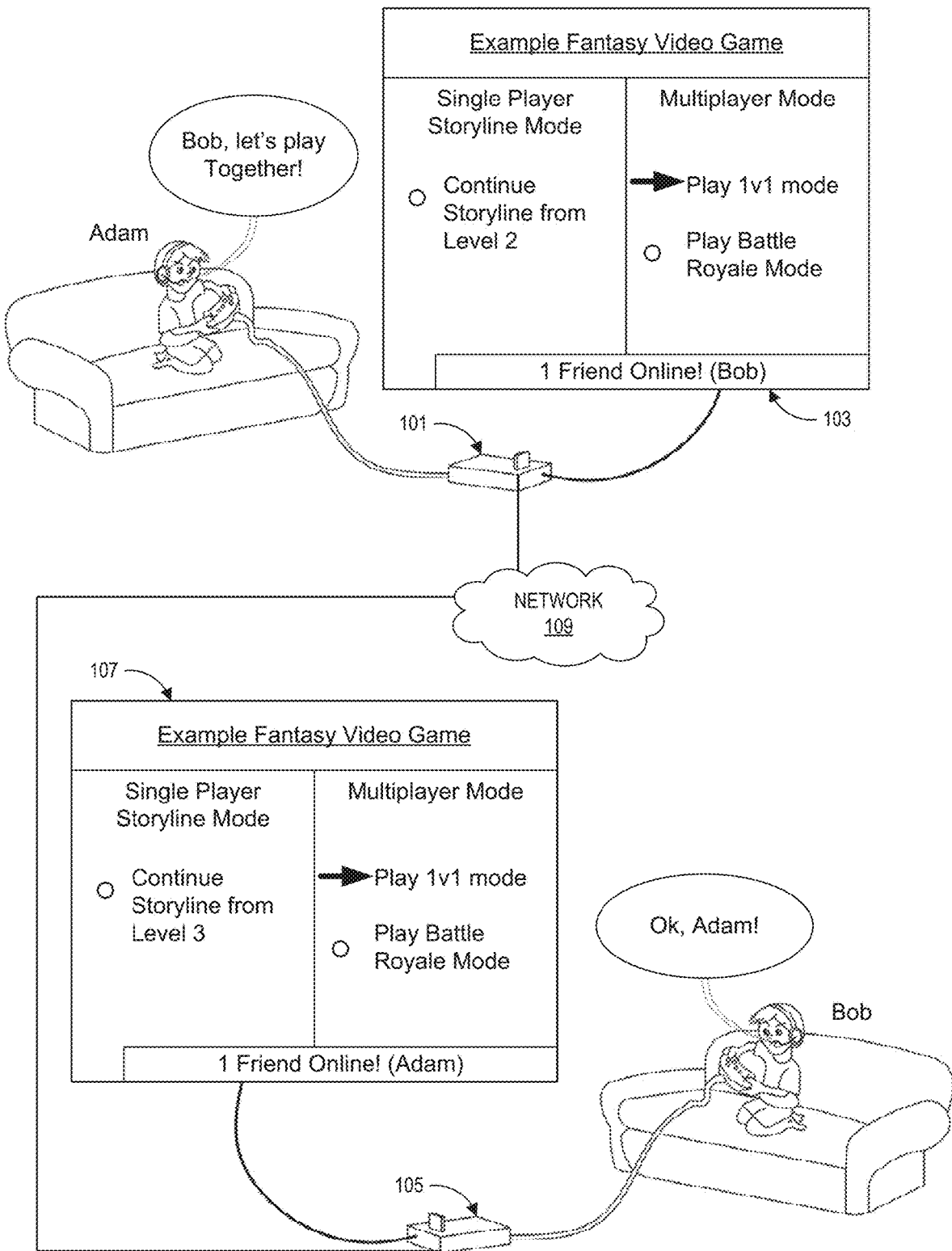
FIG. 1 illustrates an example of two players selecting to play a multiplayer mode of a video game.

Video games can have different gameplay modes to appeal to various players, such as a single player mode and a multiplayer mode. Single player mode allows a player to play alone, without interacting in the game with any other player-controlled characters. Single player modes often include a campaign featuring a storyline that takes place in a virtual world. Completing certain single player storyline objectives in the single player mode can advance the storyline. The storyline objectives may be sequenced. Some single player games can include non-linear sequences of storyline objectives that branch in different directions based on the in-game choices of the player. Progress through the storyline can be tracked based on the completion of storyline objectives while playing in the single player storyline mode. In some video games, progress through the storyline is additionally or alternatively tracked through the completion of different levels, acts, zones, chapters, or the like, each of which may include one or more storyline objectives.

At certain parts of a storyline, an optional side quest can be made available to a player in response to the player's interactions within the virtual world. The side quests may include optional storyline objectives that, when completed, will cause certain events to occur within the single player mode but are not necessary to progress through the main storyline. For example, within the single player mode, a non-player character (NPC) may assign an optional side quest to a player's character, and upon completion, reward the player's character with in-game items, experience, upgrades, new powers or abilities, or the like within the virtual world. Some video games feature "achievements" such as "win 10 games." Unlike objectives, achievements are tied to a player's account, not to events in a particular single player storyline. In embodiments disclosed herein, multiple players cannot join and play or interact in an instance of a single player storyline at the same time (though many players may be playing separate instances of their own single player storylines on different devices at the same time).

Multiplayer game modes allow two or more players to play together, providing a social aspect that can make video games more enjoyable. For example, players can compete against each other in game modes such as team battles, king of the hill, capture the flag, escort/eliminate a character, racing, battle royale, attack/defend a target, and the like. Players can also play cooperatively, such as in a cooperative multiplayer mission, in a player versus environment mode, team survival mode, and the like. Multiplayer game modes typically have one or more multiplayer objectives, and some multiplayer game modes can feature a series of multiplayer objectives in a quest format. The multiplayer objective can be based on a competitive or cooperative interaction with other players. For example, the cooperative multiplayer mission may have a series of multiplayer objectives different from the single player storyline, such as to first reach a destination together, defeat the enemies there, retrieve an item, and escape to safety. In some embodiments, the multiplayer objective can also be unaffected by and/or not affect a progression of the single player storyline. For example, players may be able to participate in a team battle multiplayer game where the multiplayer objective is to defeat the other player teams, regardless of the storyline progress of individual players. Similarly, in some embodiments, winning or losing the multiplayer team battle may not have any impact on the single player storylines of participants.

The multiplayer games take place within an instance of a multiplayer map. In some embodiments, a multiplayer map includes at least a spatial layout of an area in a virtual world in which characters and/or objects controlled by multiple players can interact with each other and/or with NPCs or other objects in the virtual world. Maps can include two dimensional layouts (for example, in side-scrolling games), three dimensional layouts (for example, in first person shooters), perspective layouts, layouts of battle arenas, and the like. In-game characters can interact with each other within the virtual world if they are in the same instance of a particular map.

Video games can include a library of maps to support multiplayer play. In some video games, the maps can include layouts that are the same as or similar to layouts from the single player storyline. For example, if part of a single player storyline takes place in an area having a castle layout, then the castle layout can be re-used in a multiplayer map, which can be optionally modified so that characters are restricted to remain inside the castle. Video games can also include maps that are different from the single player environment. Some maps may be associated with particular multiplayer objectives. For example, a map featuring a hill can support a king of the hill multiplayer competition, whereas an underwater map may not.

As disclosed herein, the multiplayer video game experience can be improved. Multiplayer maps can be dynamically modified to support the completion of one or more single player objectives for a plurality of players. For example, a first objective can be selected from among one or more storyline objectives associated with a first player's progress in the first player's storyline. A second objective can be selected from among one or more storyline objectives associated with a second player's progress in the second player's storyline. As will be described herein, when the first player and the second player play the video game in multiplayer mode, a map may be selected based at least in part on both the first player's progress and the second player's progress in their respective storylines. The map may be selected at least in part for supporting in-game mechanics enabling completion of the first objective and the second objective. The combination of the first objective, the second objective, and the map may be selected in part for their compatibility with each other. Combinations of objectives, such as a combination including the first objective and the second objective, can additionally or alternatively be selected in order to provide larger or the largest quantity of players with storyline objectives to complete while playing on the multiplayer map.

Systems, tools, and methods disclosed herein can help video game developers improve the coverage of combinations of various objectives and maps. A directed search can be used to determine restricted combinations. A computer system can generate and suggest changes to the video game to improve coverage.

Example Multiplayer Game

FIG. 1 illustrates an example of two players selecting to play a multiplayer mode of a video game. FIG. 1 includes a first player (Adam) and a second player (Bob). The first player is playing a fantasy video game on a first computer system 101 configured to generate a first video output 103. The second player is playing the fantasy video game on a second computer system 105 configured to generate a second video output 107. The computer systems 101 and 103 are connected to each other via a network 109 such as the Internet or a local area network.

The first computer system 101 and the second computer system 103 can be, for example, a console, a desktop, a laptop, a smartphone, a handheld gaming device, and the like. The first computer system 101 and the second computer system 103 are running Example Fantasy Video Game, which includes a single player storyline mode and a multiplayer mode.

The user interface 103 indicates that the first player (Adam) has progressed in the single player storyline to level 2 and shows Adam that his friend Bob is also online. The user interface 107 indicates that the second player (Bob) has progressed in the single player storyline to level 3 and shows Bob that his friend Adam is also online. Adam and Bob can communicate and coordinate to play a particular multiplayer game mode of Example Fantasy Video Game together, such as a one versus one mode where the multiplayer objective is to defeat the other player, or a battle royal mode where the multiplayer objective is to be the last player remaining.

Figure 2:
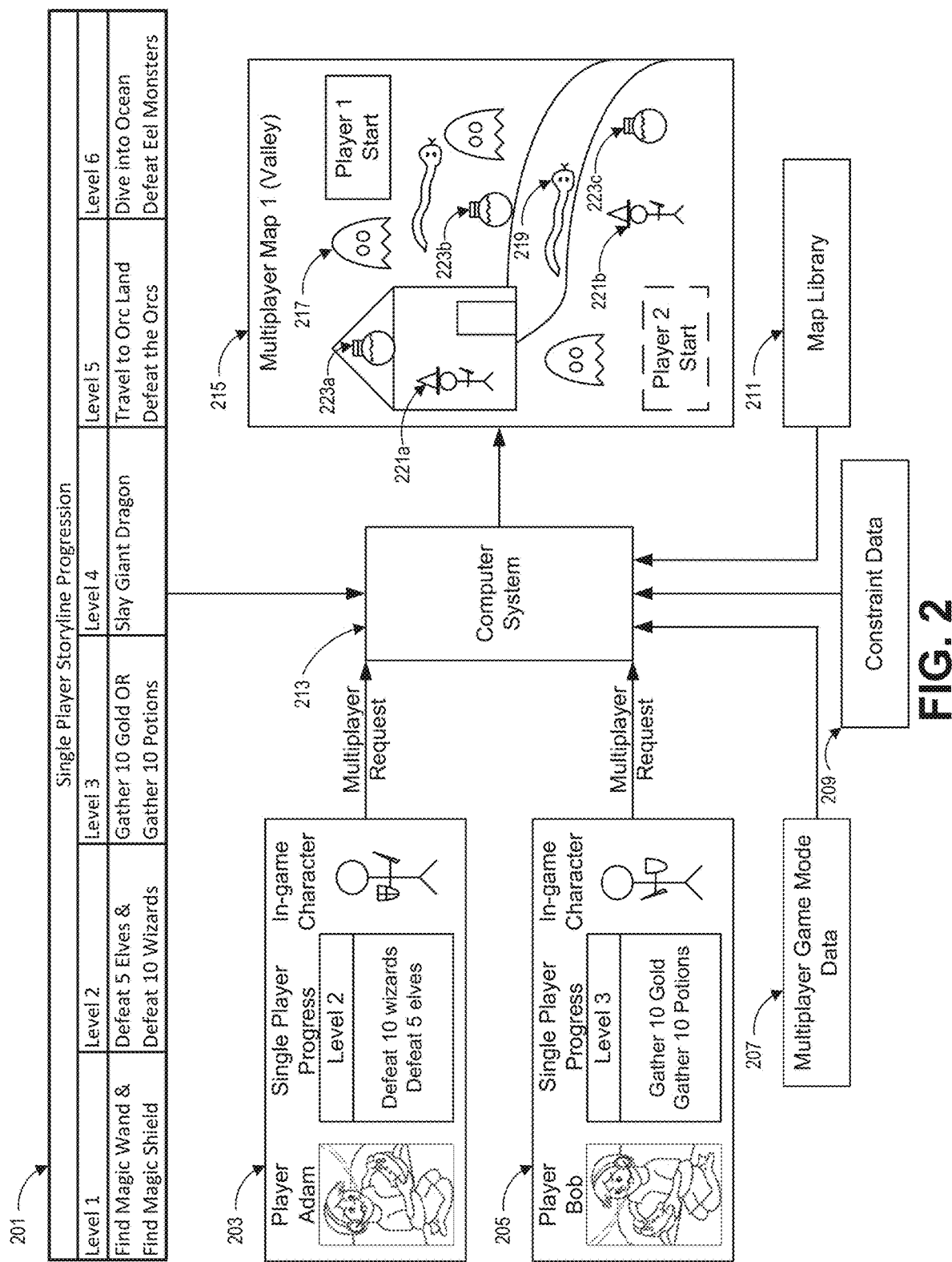
FIG. 2 illustrates an example system for dynamically generating a multiplayer map based on single player storyline objectives.

In response, and as further illustrated in and described with respect to FIG. 2, a computer system can select a combination of objectives for the players to complete in the multiplayer game mode. A first objective can be selected among one or more first single player storyline objectives available to the first player in the single player storyline mode. A second objective can be selected from among one or more second single player storyline objectives available to the second player in the single player storyline mode. A multiplayer objective, such as to defeat the other player's character, can be selected based at least in part on a user request to play a selected game mode (1v1) of the multiplayer game. The computer system can also select a multiplayer map supporting at least the first objective, the second objective, and the multiplayer objective based at least in part on their compatibility with each other.

FIG. 2 illustrates an example system for dynamically generating a multiplayer map based on single player storyline objectives. FIG. 2 continues the example described with respect to FIG. 1. FIG. 2 includes a table 201 showing storyline objectives associated with level progression through a single player storyline, a first user profile 203, a second user profile 205, multiplayer game mode data 207, constraint data 209, a map library 211, a computer system 213, and a multiplayer map 215. The multiplayer map 215 includes a layout showing the relative locations of player starting points, a road leading to a house, ghosts 217 and snakes 219 as default units, wizards 221a-221b, and potions 223a-223c. In various embodiments, the map 215 can indicate locations of individual units, locations of groups of units, locations where those units will repeatedly spawn or be created, and the like.

The table 201 shows storyline objectives assigned to players at each level of six levels in the single player storyline mode. For example, the storyline objectives available to a player at level 2 in the storyline includes both defeating 5 elves and defeating 10 wizards, both of which are required to be completed in order to progress to level 3 in the storyline. At level 3, a player's available quests include gathering 10 gold or gathering 10 potions, either one of which can be completed to progress to level 4 in the storyline. Some levels, such as level 6, may include objectives to be completed in a sequence: a player's character must first dive into the ocean where eel monsters can be encountered, and then defeat the eel monsters. Other storylines may include non-linear progression, different storyline endings, different orders of objectives, and other variations.

The first user profile 203 provides data about a first player who sent a first request to play a multiplayer mode of the video game. The first user profile 203 indicates a single player storyline progress of the first player. The single player storyline progress can be indicated directly or indirectly, such as by identifying the presently pending storyline objectives for the player or with reference to a level in the single player storyline. The level provided in the user profile 203 can be referenced against the table 201 to determine pending single player storyline objective(s) of the first player, which in this example includes defeating 5 elves and defeating 10 wizards.

The second user profile 205 indicates similar data about the second player, including who sent a second request to play the multiplayer mode of the video game and data about the storyline progress of the second player. The storyline progress of the second player can indicate or be used to determine pending single player storyline quest(s) of the second player which, in this example, include gathering 10 gold or gathering 10 potions. Subsequent discussions of the first player and the second player will be based on the understanding that the first player and the second player have started and progressed to different parts of the single player storyline unless explicitly indicated otherwise.

Multiplayer game mode data 207 can optionally indicate a selected multiplayer game mode, such as 1v1. The selected multiplayer game mode can be used for selecting a corresponding multiplayer objective such as to defeat the other player.

The map library 211 includes one or more maps that can be played in the various multiplayer game modes. In some embodiments, each map in the library can have metadata indicating which storyline objectives or combinations thereof are compatible with each respective map. In some embodiments, the constraint data 209 includes metadata indicative of which storyline objectives or combinations thereof are compatible with each respective map.

The constraint data 209 can be used to select one or more maps from the map library 211 according to one or more constraints, as further described below with respect to FIG. 3A and FIG. 3B. Certain maps may be compatible or incompatible with certain multiplayer game modes and/or storyline objectives. A map may be incompatible with an objective if the video game code does not support in-game mechanics allowing the objective to be completed. For example, the map 215 would be incompatible with the level 6 objective to "Defeat Eel Monsters" if the video game code does not provide for eel monsters to be present on the map or if the eel monsters were present but could not be defeated. In some embodiments, a playlist including a plurality of compatible multiplayer maps can be selected, and the multiplayer video game can be instantiated using one of the multiplayer maps from the playlist.

The constraint data 209 can also be used to select a first objective from among the one or more storyline objectives presently available to the first player and a second objective from among the one or more storyline objectives presently available to the second player to find a combination of objectives supported by at least one map from the map library 211, where the selected map also supports the multiplayer objective associated with the selected multiplayer game mode 207. In the illustrated example shown in FIG. 2, the selected first objective is to defeat wizards, and the selected second objective is to collect potions. The Multiplayer Map 1 (Valley) is selected as the multiplayer map based at least in part on the compatibility of Multiplayer Map 1 with the selected first and second objectives and with the selected 1v1 multiplayer objective. In various embodiments, the selected objectives can be the same as the corresponding single player objectives (e.g., defeat 10 wizards, gather 10 potions) or a similarly related subset (e.g., defeat 2 wizards, gather 3 potions) that would count as progress toward the corresponding single player objective.

The computer system 213 can create an instance of Multiplayer Map 1 for the players to play in and interact with each other as part of the selected multiplayer game mode. The players' characters can spawn at the illustrated starting locations in the map and interact with other units in the virtual world (such as the ghosts 217, snakes 219, and wizards 221a-221b), terrain (such as the road), structures (such as the house), and other in-game elements according to the in-game mechanics of the video game. The in-game mechanics can also include rules for interactions, moving, attacking, powering up, gaining experience, gaining lives, losing lives, and the like.

In the instance of the video game in the example of FIG. 2, the multiplayer objective for both players can be to defeat the other player. The players can also be assigned at least one selected objective. The first player (and optionally any other players) has the first objective to defeat wizards. The second player (and optionally any other players) has the second objective to collect potions.

The single player storyline progression of the first and second players can be affected by their respective completion of the assigned objectives while playing in the multiplayer mode. For example, any wizards defeated by the first player in the multiplayer game can be credited as progress in level 2 of the single player storyline of the first player. If the first player manages to defeat 10 wizards while playing in the multiplayer mode with the second player, then user profile 203 of the first player can be updated to indicate that the first player has completed the "Defeat 10 wizards" objective part of level 2. Similarly, any potions collected by the second player in the multiplayer game can be credited as progress in level 3 of the single player storyline of the second player. If the second player manages to collect 10 potions while playing in the multiplayer game, then the second player can progress to level 4 in the single player storyline, and the user profile 205 of the second player can also be updated accordingly.

Figure 3A:
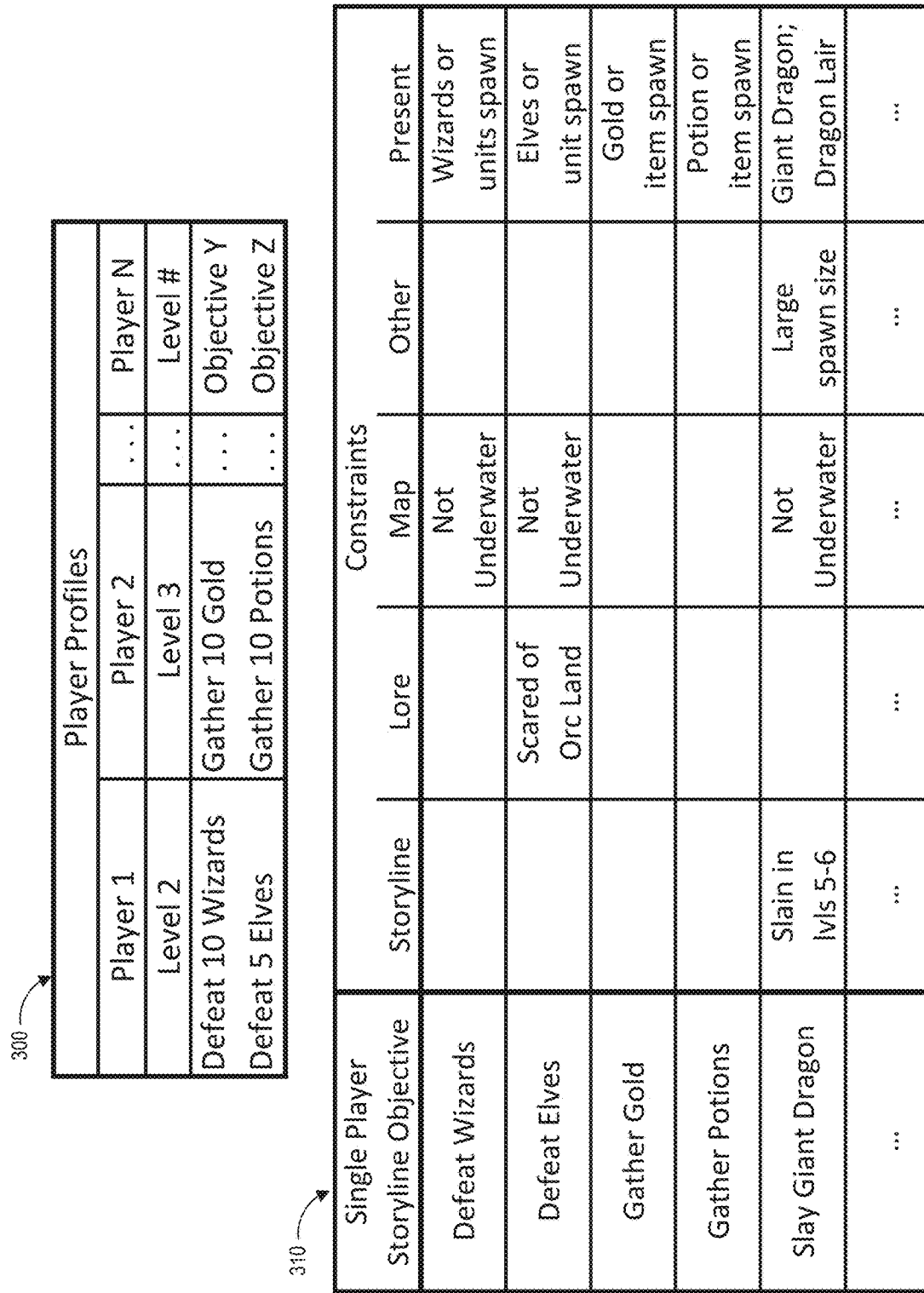
FIG. 3A illustrates an example set of player profiles, single player objectives, and constraints.

FIG. 3A illustrates an example set of player profiles, single player objectives, and constraints. FIG. 3B illustrates a table of example multiplayer maps and related metadata. The relationships shown in the tables of FIG. 3A and FIG. 3B can be implemented as data tables and/or any type of data structure or combination thereof, such as objects and properties, key-value pairs, coded logic, and the like.

FIG. 3A includes a first table 300 and a second table 310. The first table 300 identifies players, their corresponding progress in the single player storyline, and storyline objectives presently pending for each respective player. The second table 310 identifies the single player storyline objectives and corresponding constraints, if any.

The constraints indicate incompatibilities of objectives with other objectives and/or maps. One type of constraint is a storyline constraint. For example, if the Giant Dragon is slain in level 4 of the single player storyline and is not later resurrected in the storyline, then the Giant Dragon should remain slain in subsequent parts of the storyline for consistency. If players A and B want to play a multiplayer game, with player A at single player level 4 (Slay Giant Dragon objective) and player B at level 5, then it would be incompatible with player B's progress in the storyline for the Giant Dragon to be alive again.

Another type of constraint is a lore constraint. The video game may have lore imposing certain restrictions in the virtual world. The lore can optionally be reflected in the storyline or the video game's mechanics. For example, in the Example Fantasy Video Game, the elves are too scared of Orc Land and therefore do not go to Orc Land. Therefore, in the video game, the objective to defeat elves can be incompatible with any map set in Orc Land.

Another type of constraint is a map constraint. Certain elements of maps may be incompatible with certain objectives. For example, wizards, elves, and giant dragons breathe air and would be incompatible with any maps that are underwater.

Another type of constraint can be a required presence of certain types of elements in a map. For example, the objective to defeat wizards may require that wizards already be in a map, that a map has available unit spawn locations where wizards can be added, or that the video game code otherwise allows wizards to be included in the map, such as by replacing another unit with wizards. As another example, the objective to gather gold can require that gold already be present in a map, that the map has available item spawn locations where gold can be added, or that the map can be otherwise modified to include gold, such as by having gold drop upon defeating certain enemies. As another example, the objective to slay the Giant Dragon can require that the Giant Dragon already be present in the map or that the map has area available for a dragon lair with the Giant Dragon to be added to the map.

There can be other types of constraints. For example, the Giant Dragon may be limited to maps with large open spaces. A map layout of a medium sized building, for example, would not be large enough to accommodate the Giant Dragon.

FIG. 3B illustrates a third table 320 identifying multiplayer maps, related elements, related constraints, and compatibility information. Each map can be identified by a number or name. The various maps can have core and swappable map elements. Core elements can be central to a multiplayer map's design for any number of reasons. For example, the multiplayer map Ocean may be associated with a multiplayer objective for players to find sunken treasure, so the Ocean map is designed to include sunken treasure as a core element. As another example, the map Orc Land is designed to include orc type units in view of the name. As another example, the Castle map may have a multiplayer objective for players to rescue a princess and be designed to have a princess in one of the castle rooms.

Swappable elements can be changed for an instance of a map without substantially affecting the design of a map. Types of swappable map elements can include units, items, terrain features, resources, artwork, and the like. For example, the Castle map may have soldiers who are guarding the princess, but the Castle map could alternatively include wizards as guards in place of the soldiers. Accordingly, the swappable elements can be replaced by other elements of similar types. For example, units can be replaced with other similar units, items can be replaced with other similar items, resources can be replaced with other similar resources, and the like.

The various maps can have corresponding constraints. The constraints in table 320 can be similar to the constraints described with respect to table 310 of FIG. 3A. In FIG. 3B, the table 320 includes affirmatively and negatively recited constraints. The affirmative constraints affirmatively describe what each respective map does feature or include. The negative constraints describe things that each respective map is not compatible with or cannot support. For example, the Ocean map is an underwater map and does not support land-only units. The Orc Land map has orcs and does not support water-only units and, according to the previously described lore constraint, does not have elves present.

The table 320 includes a column 321 indicating single player storyline levels that have at least one storyline objective that can be supported in an instance of the multiplayer map. For example, the Valley map can support at least one storyline objective from each of the levels 1 through 5, but not six, of the single player storyline mode.

The table 320 can also include entries indicating compatible storyline objectives and/or incompatible storyline objectives. For example, the Ocean map is indicated as compatible with storyline objectives to defeat eels, to find potions or other items, and the like. A map is compatible with a storyline objective when the map and the storyline objective do not have any inconsistent constraints. The Ocean map is indicated as incompatible with storyline objectives to defeat elves, defeat wizards, or other storyline objectives relating to land-only units, and the like. A storyline objective can be incompatible with a map for having at least one inconsistent constraint.

Example Multiplayer Map Layouts

Figure 4:
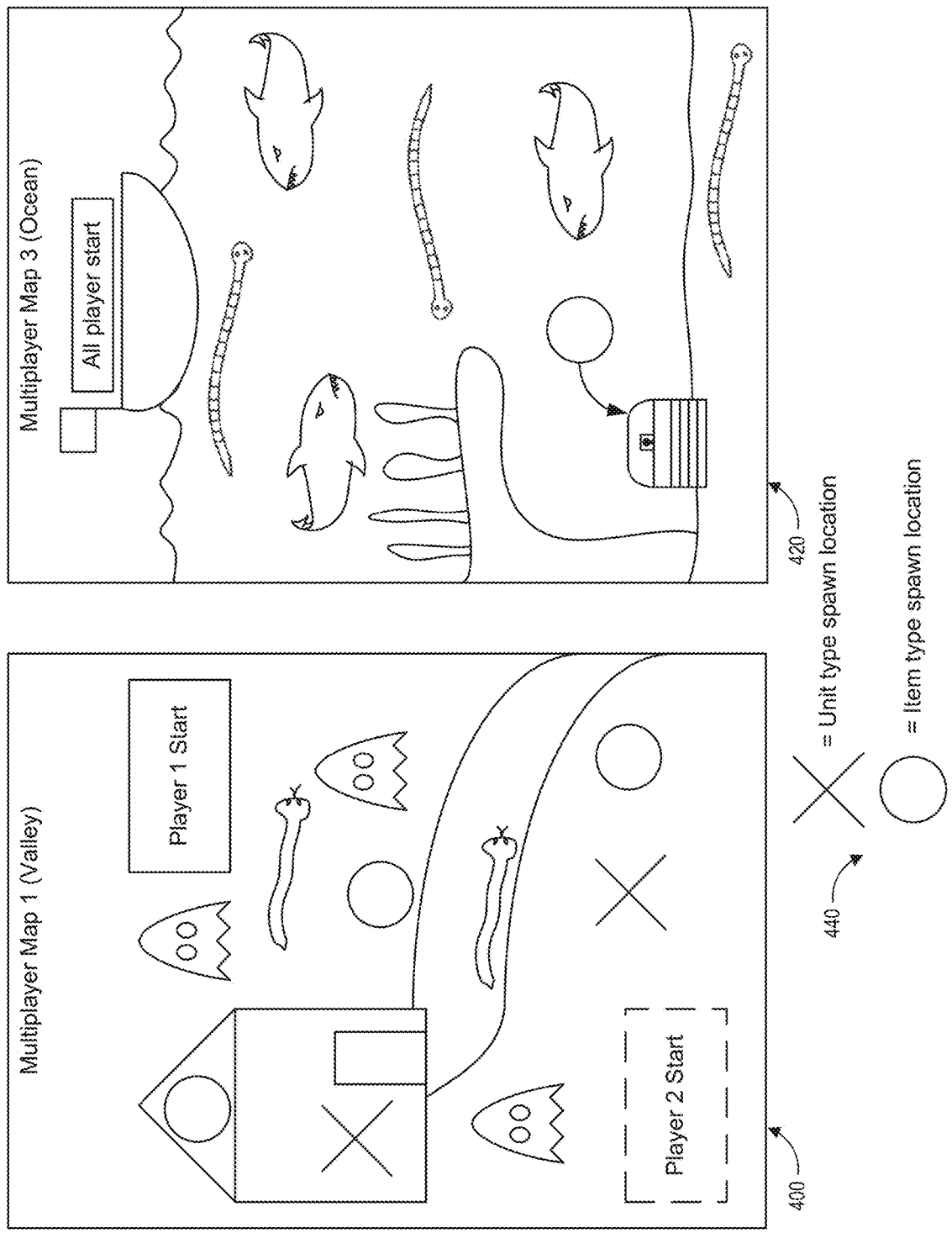
FIG. 4 illustrates an example of two multiplayer map layouts.

FIG. 4 illustrates an example of two multiplayer map layouts including a first layout 400 for the Valley map and a second layout 420 for the Ocean map. A legend 440 is provided to indicate what various symbols in the map layouts 400 and 420 represent. The first layout 400 indicates a spatial layout of a valley in a virtual world. The second layout 420 indicates a spatial layout in an ocean in the virtual world. The map layouts 400, 420 and any number of other map layouts can be included in a map library for the video game. The maps may represent the placement (such as by coordinates, relative positions, or in another manner) of various elements in a 2D or 3D virtual space, depending on the embodiment. It will be appreciated that the maps as depicted in FIG. 4 are illustrative graphical representations of stored map data. The map data itself may refer to each element or object included in the map by reference to an object identifier (e.g., an identifier for a 3D snake object or treasure chest object) without actually including within the map file the full object data for the various objects or elements referenced therein.

The Valley Map includes terrain features, such as a road leading to a house, and the locations of default units on the map, such as snakes and ghosts. The Ocean map includes terrain features, such as the water, the bottom of the ocean, and a cave. The Ocean map also includes the locations of default units on the map, such as sharks and eel monsters, and the location of interactive items, such as the treasure chest.

According to the legend 440, X's indicate optional locations in the maps where certain types of units can be spawned or otherwise created and O's indicate optional locations in the maps where certain types of items can be spawned or otherwise created. Maps can also include optional spawn locations for resources, terrain features, other players, and the like. By including optional spawn locations that can support a variety of in-game elements, the compatibility of maps with various storyline objectives can be expanded by allowing maps to include elements associated with storyline objectives. For example, by default, the Valley map may not include wizards or elves, but because wizards and elves are units that can be created at the unit spawn locations, the Valley map can support the storyline objectives assigned to a player at level 2 of the single player storyline. The illustration in FIG. 4 shows static spawn locations, but other types of spawn locations can be random, vary in response to events that occurred in the single player storyline, or be otherwise dynamically generated.

In various maps, some, none, or all of the default units may be core elements. In various maps, some, none, or all of the map elements may be swappable. By including optional swappable elements, the compatibility of maps with various storyline objectives can be expanded by allowing maps to include elements associated with storyline objectives. For example, by default, the Valley map may not include a Giant Dragon or a dragon lair, but by making the house optionally swappable with a dragon lair including a Giant Dragon inside, the Valley map can support either of the storyline objectives assigned to a player at level 4 of the single player storyline mode.

Although the map layouts illustrated in FIG. 4 are visually drawn for ease of understanding, map layouts can be stored in a library as code or other data structures. Some maps can include randomly or algorithmically generated elements. For example, a video games can have an engine configured to dynamically generate a valley map having a random configuration of grasslands and hills at various elevations with units at randomly or algorithmically selected locations.

Accordingly, a multiplayer map can be modified from a template, generated, assembled, or otherwise configured to include a first element and a second element. In some embodiments, the first element may be included so that the map mechanics allow for the completion of a first objective selected from among one or more storyline objectives available to a first player. The second element may be included so that the map mechanics allow for the completion of a second objective selected from among one or more storyline objectives available to a second player. Additional elements can be included in the map to support storyline objectives for any number of other players who will be playing in the multiplayer map. Accordingly, two, any plurality, or all of the players in the multiplayer map can complete a storyline objective in addition to a multiplayer objective while playing on the multiplayer map.

Example Process

Figure 5:
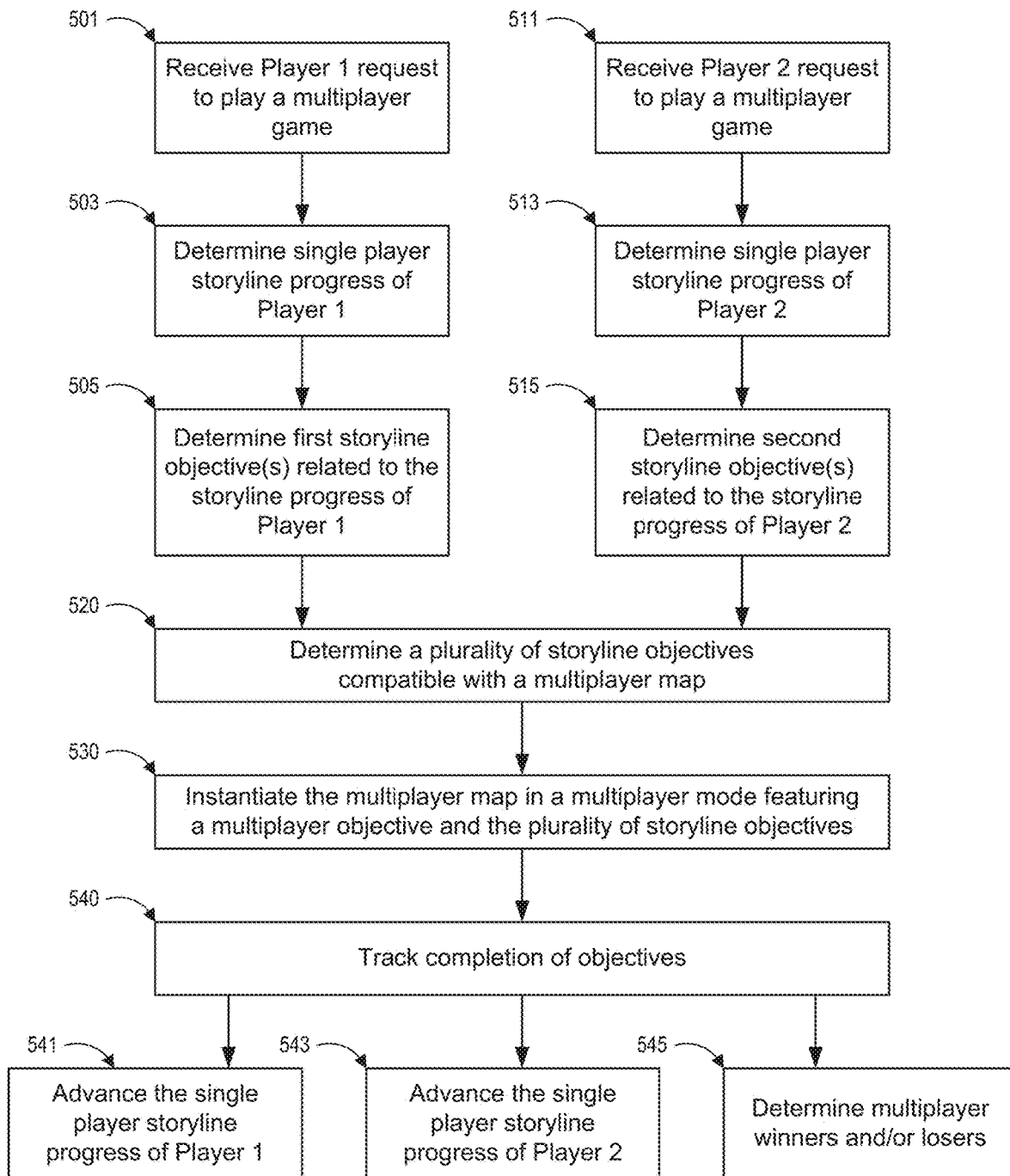
FIG. 5 illustrates a block diagram of an example flowchart for dynamically assigning single player storyline objectives in a multiplayer mode of a video game

FIG. 5 illustrates a block diagram of an example flowchart for dynamically assigning single player storyline objectives in a multiplayer mode of a video game. The teachings discussed with respect to FIG. 5 can be performed by any combination of a server and one or more connected computer systems (such as the computer systems 101 and 105 described with respect to FIG. 1 and/or the computer system 213 described with respect to FIG. 2). Accordingly, where disclosure of performance is recited, the corresponding communication such as access, transmission, and/or reception of data can be additionally or alternatively implemented. In various embodiments, any combination of the blocks can be performed by a client and/or server.

At block 501, a request for playing in a multiplayer mode of a video game is received from a first player, such as from a computing device operated by the first player.

At block 503, the single player storyline progress of the first player can be determined. For example, it can be determined that in the single player storyline, the first player is at a particular level or at a particular objective in a sequence of objectives.

At block 505, one or more first storyline objectives related to the storyline progress of the first player are determined.

The one or more first storyline objectives can be storyline objectives from the single player mode of the video game that are presently available and/or assigned to the first player.

At block 511, a request for playing in a multiplayer mode of a video game is received from a second player, such as from a computing device operated by the second player. Block 511 may occur before or after block 501.

At block 513, the single player storyline progress of the second player can be determined. For example, it can be determined that in the single player storyline, the second player is at a particular level or at a particular objective in a sequence of objectives. In the illustrated example, the first player and the second player have progressed to different parts of the storyline.

At block 515, one or more second storyline objectives related to the storyline progress of the second player are determined. The one or more second storyline objectives can be storyline objectives from the single player mode of the video game that are presently available and/or assigned to the second player.

At block 520, a plurality of storyline objectives compatible with a multiplayer map can be determined. The plurality of storyline objectives includes a first objective selected from among the one or more first storyline objectives. The plurality of storyline objectives also includes a second objective selected from among the one or more second storyline objectives.

The determination of compatibility can be based at least in part on constraints associated with the objectives and the maps, such as described with respect to FIG. 3A and FIG. 3B. In some embodiments, a look up table of which combinations of objectives are compatible with which maps can be used. In some embodiments, a directed search can be performed. In other embodiments, other types of algorithms can be used to determine the compatibility based at least in part on constraints.

In some video games where multiplayer games can include more than two players, blocks 501-520 can be extended to include at least one pending storyline objective for each player in the multiplayer game. In cases where no combination of storyline objectives are compatible with any map, the process can optionally proceed based on a plurality of storyline objectives supporting the largest quantity of players.

At block 530, the multiplayer map can be instantiated in the multiplayer mode and feature a multiplayer objective and support for the plurality of storyline objectives. The multiplayer map can be configured to enable any in-game mechanics needed for completing the plurality of storyline objectives. For example, any units, resources, items, terrain features, structures, or other elements can be created, swapped in, generated, algorithmically selected, or otherwise made present on a map as described with respect to FIG. 3A, FIG. 3B, and FIG. 4. In game mechanics can also include events, rules, and other mechanics. For example, if an objective requires casting a particular type of spell to defeat enemies at night, then players can be armed with the particular spell in an instance of the map configured to take place at night, even if the map does not make the particular spell available by default and is set during the day by default.

Other examples of configuring in-game mechanics to support the storyline objectives can including adding or modifying cut scenes, dialog, NPC's, other objectives, and the like. For example, a competitive multiplayer mission may have a multiplayer objective for players to first reach a castle, then defeat the soldier guards, and then rescue a princess before the other players. The multiplayer mission may begin with a cut scene where an NPC asks the players for help because the princess has been kidnapped by soldiers, offering a reward to the first player to rescue the princess. The plurality of storyline objectives includes a first objective selected from among the one or more first storyline objectives, the first objective being to defeat 10 wizards. The objective to "defeat wizard guards," can be additionally added in or swapped in place of the "defeat solider guards" objective, wizards can be added in the appropriate locations, and the cut scene can be modified to mention that wizards, in addition to or in place of the soldiers, have kidnapped the princess.

In the instance of the multiplayer map, a multiplayer objective can be assigned to the players based on at least one of a selected multiplayer mode or the multiplayer map. For example, players can select to play in a player versus player or a team survival mode, and the multiplayer objective can be set as defeating other players or to ensure that your team survives, respectively. In some embodiments, the multiplayer mode can depend on a selected map. For example, a team of players in multiplayer cooperative mode on a castle map may be assigned the multiplayer objective of having at least one team member rescuing a princess trapped in the castle, whereas a team of players playing in multiplayer cooperative in an ocean map may be assigned the multiplayer objective of having at least one team member retrieve sunken treasure.

In the instance of the multiplayer map, the plurality of storyline objectives from block 520 can be assigned to the players. Assigning the plurality of storyline objectives can include assigning the first objective to the first player and assigning the second objective to the second player. The first objective can optionally be assigned to other players, such as the second player. The second objective can optionally be assigned to other players, such as the first player.

At block 540, the completion of objectives by the various players is tracked. In response to the completion of the objectives by the various players, block 540 can proceed to blocks 541, 543, and/or 545.

At block 541, the single player storyline progress of the first player can be advanced in response to the first player's completion of the first objective during the multiplayer mode.

At block 543, the single player storyline progress of the second player can be advanced based on the second player's completion of the second objective during the multiplayer mode. The single player storylines of any other players can also be advanced based on their respective completion of storyline objectives while playing in the multiplayer mode.

At block 545, winners and/or losers of the multiplayer mode can be determined based at least in part on whether or not the various players completed the multiplayer objective.

Example Developer Tools

FIG. 6 illustrates an example user interface 600 showing compatibilities of multiplayer maps with different combinations of levels and storyline objectives from a single player storyline mode. The user interface 600 can help video game developers identify coverage gaps where no or few combinations of storyline objectives are supported by multiplayer maps. The user interface 600 includes an example table for a multiplayer game supporting single player objectives for at least four players. A first column 601 indicates combinations of storyline levels (from 1 to N, where N can be any number) that the four players have progressed to, each level being associated with one or more storyline objectives.

The next column 603 indicates which multiplayer maps are compatible or incompatible. Compatible multiplayer maps are indicated as compatible if those multiplayer maps support, by default or through programmed configurations, at least one storyline objective available for players at each of the indicated levels without constraint problems. Otherwise, the multiplayer maps are marked as incompatible.

The next column 605 lists, for each level indicated in 601, the various combinations of storyline objectives that are available to players in the single player storyline.

The next column 607 indicates whether the particular combination of objectives from column 605 is compatible with at least one multiplayer map.

The next column 609 indicates which multiplayer maps are compatible with the particular combination of objectives from column 605. Another column (not illustrated) can additionally or optionally indicate which multiplayer maps are incompatible with the particular combination of objectives from column 605.

The next column 611 indicates which constraints may be restricting compatibility between maps from column 603 and the particular combination of objectives in column 605.

The data can be visually presented so that large gaps in coverage can be quickly identified. The information can be presented in other visual forms, such as in charts, bar graphs, histograms, webs, and the like. Large areas of incompatible combinations can be highlighted, bolded, or otherwise visually indicated.

For example, it can be easily seen that if any player is at level two in the storyline while another player is at level one in the storyline, then there is no compatible combination of objectives that is supported on any map. Accordingly, video game developers can resolve the incompatibility by introducing new objectives in level one or level two to improve coverage, by creating or modifying a map to support a combination of objectives including at least one objective from level one and one objective from level two, or by taking other similar actions.

Figure 7:
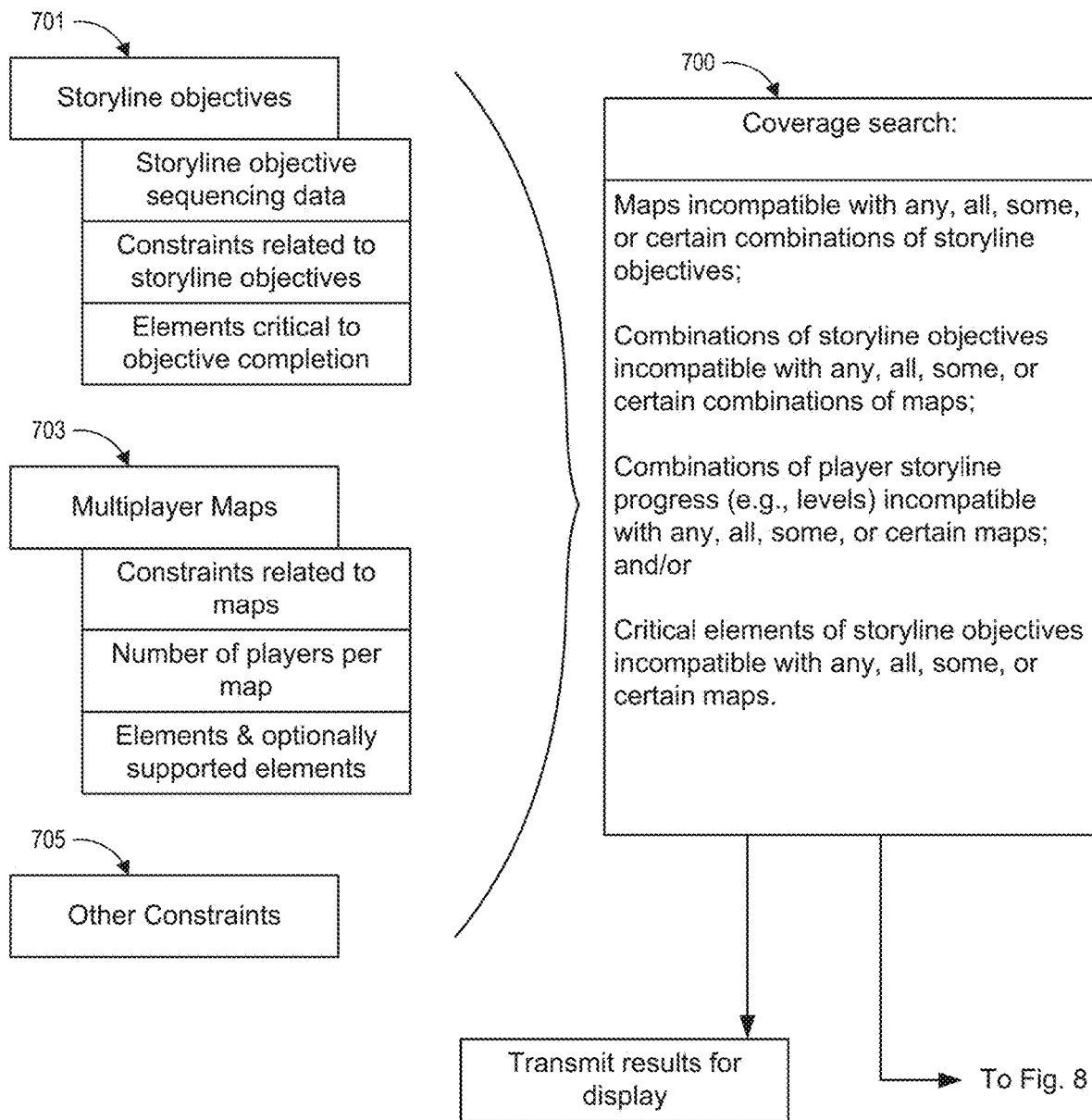
FIG. 7 illustrates a block diagram of an example computer search process to report on compatibility coverage.

FIG. 7 illustrates a block diagram of an example coverage search process 700. The search process 700 can be performed by a computer system such that the computer system acts as a tool for identifying coverage gaps where no or few combinations of storyline objectives are supported by multiplayer maps and/or identifying the causes for lack of support.

Inputs to the search can include a database of storyline objectives 701 and related metadata. The related metadata can include, for example, storyline objective sequence data indicating the sequence of storyline objectives assigned to players as the single player storyline progresses. The related metadata can additionally or alternatively include constraints related to the storyline objectives. The related metadata can additionally or alternatively include information about elements critical to objective completion, such as whether certain items, units, locations, resources, structures, terrain features, actions, and the like need to be available to enable potential completion of the objective.

Inputs to the search can also include a database of multiplayer maps 703 and related metadata. The related metadata can include, for example, constraints related to each of the maps. The metadata can additionally or alternatively include the number of players supported on each map. The metadata can additionally or alternatively include the elements present in each map by default and the elements that can be optionally implemented on each map.

Inputs to the search can also include any other type of constraints 705. The other constraints can include, for example, lore constraints, rules for matchmaking, and the like.

The process 700 can search for maps that are incompatible with any, all, or certain combinations of storyline objectives. For example, the search can find multiplayer maps that are compatible with zero combinations of storyline objectives, that are compatible with at most one combination of storyline objectives, or any other threshold number of combinations of objectives. The maps, objectives, constraints, levels, resources, elements, or other aspects of the video game can be modified to improve coverage of maps with more combinations of storyline objectives.

The process 700 can additionally or alternatively search for restricted combinations of storyline objectives that are incompatible with any, all, or certain combinations of maps. For example, the search can identify combinations of objectives (such as an objective to slay a Giant Dragon combined with an objective to defeat eel monsters) that are compatible with zero maps, with at most one map, or any other threshold number of maps. The maps, objectives, levels, constraints, resources, elements, or other aspects of the video game can be modified to improve compatibility of the resulting combinations of storyline objectives with multiplayer maps.

The process 700 can additionally or alternatively search for restricted combinations of player storyline progress (such as when players are at certain levels in the storyline) incompatible with any, all, or certain maps. For example, the search can identify combinations of levels (such as level combination 1-2-4-6) for which no pending storyline objectives can be respectively selected (e.g., selecting a storyline objective from level 1, a storyline objective from level 2, a storyline objective from level 4, and a storyline objective from level 6) to result in a combination of storyline objectives supported on at least one map, at least two maps, or any other threshold number of maps. The maps, objectives, levels, constraints, resources, elements, or other aspects of the video game can be modified to improve compatibility of the combinations of storyline objectives with multiplayer maps.

The process 700 can additionally or alternatively search for restricted in-game elements that are critical to completing storyline objectives that are incompatible with any, all, some, or certain maps. For example, the search can identify elements that are compatible with at most zero maps, at most one map, or any other threshold number of maps. For example, the search can identify that a particular type of resource that is required to be gathered in a storyline objective is not compatible with any map. The maps, objectives, levels, constraints, resources, elements, or other aspects of the video game can be modified to improve compatibility of the resulting combinations of storyline objectives with multiplayer maps.

In addition to providing the search results, the coverage search can indicate reasons for compatibilities and/or incompatibilities. For example, the search results can indicate whether and/or how many incompatibilities are caused by a lore constraint, by a storyline constraint, by certain critical elements being unsupported by maps, and the like.

The results from the coverage search 700 can be transmitted for display, such as in a user interface on a display screen. The results can be displayed as a list, a table, in a visualization such as a graph or chart (for example, as shown in FIG. 6), and the like. The results can be ordered to show least compatible objectives, maps, levels, and/or elements.

Figure 8:
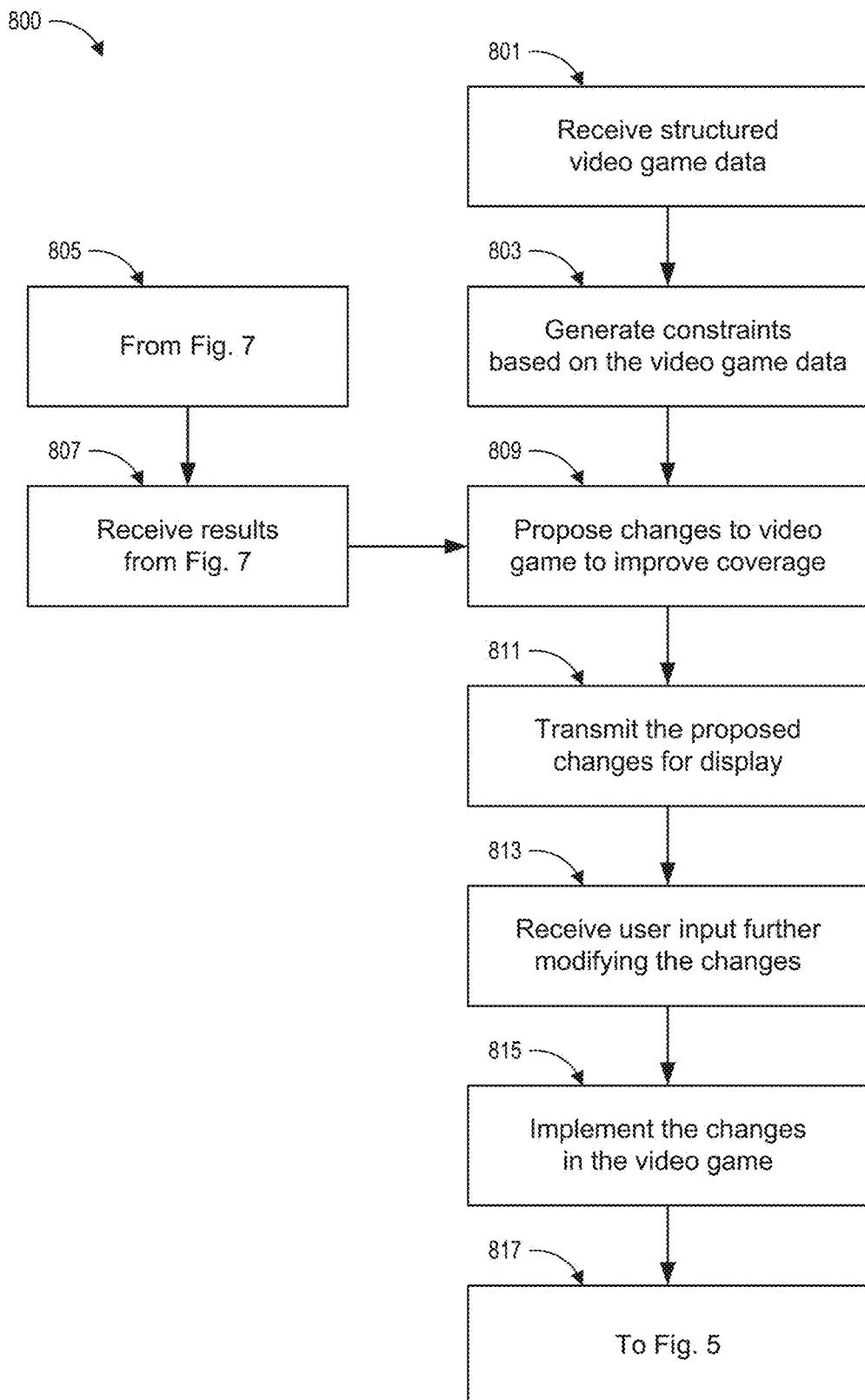
FIG. 8 illustrates a block diagram of an example method for improving the compatibility of multiplayer maps with combinations of storyline objectives.

The results from the coverage search 700 can additionally or alternatively be provided as an input in the flowchart shown in FIG. 8.

FIG. 8 illustrates a block diagram of an example flowchart 800 for improving the compatibility of multiplayer maps with combinations of storyline objectives. At block 801, structured video game data can be received. The structured video game data can include, for example, a library of video game code for a plurality of video games, databases and metadata related to the plurality of video games, and/or the code for the video game searched by the search 700.

At block 803, a computer system can generate constraints based on the video game data. For example, the computer system can use a machine learning algorithm, classification algorithm, artificial intelligence system, pattern recognition system, or other technique to generate constraints. The generated constraints can reflect the types of constraints present in the plurality of video games.

At blocks 805 and 807, the results from FIG. 7 can be received. The results can indicate storyline objectives, maps, elements, or other results identified by the coverage search 700. At block 809, a computer system can propose changes to the video game to improve compatibility coverage, the proposed changes being consistent with constraints of the plurality of video games.

For example, a classification system can recognize that other video games in the plurality of video games have types of objectives, levels, elements, game progression, or other aspects that are not in the present video game, so the classification system can suggest that the missing objectives, levels, elements, game progression, or other aspects be added to the present video game if doing so is consistent with constraints and will improve the compatibility coverage in at least one aspect. The proposal can include code, such as code generated based on or copied from the plurality of video games. The proposal can additionally or alternatively include a template, such as an archetype template, for developers to fill in with code.

As an example of a proposed change to improve coverage, a system can determine that there is presently no map supporting a combination of storyline objectives for players at levels X and Y in a single player storyline mode of a video game. The computer system may determine, based on the received structured video game data, that quests to collect items or resources, such as gold, can be supported across a wide range of both single player levels and multiplayer maps with few constraints. Accordingly, a template can be suggested for developers to add "Gather #gold or other resource" to either level X or level Y if doing so will enable players at levels X and Y to have at least one storyline objective supported by at least one multiplayer map when playing multiplayer mode together.

As another example of a proposed change to improve coverage, a system can determine that there is presently no map supporting a combination of storyline objectives for players at levels Y and Z in a single player storyline mode of a video game. Players on these levels may have pending storyline objectives A and B, respectively. The computer system may determine, based on the structured video game data that in other video games, that certain types of multiplayer maps have supported objectives similar to A and B. The computer system can suggest adding those certain types of multiplayer maps so that the combination of objectives A and B will be supported by at least one multiplayer map.

At block 811, the proposed changes can be transmitted for display. Developers can review the proposed changes. At block 813, user input further modifying the proposed changes can be received. For example, developers can edit or modify proposed code. If a template was proposed, then developers can fill in the template with code.

At block 815, the changes can be implemented in a video game to improve the compatibility coverage such that more combinations of players from different storyline levels have pending objectives supported by more maps. At block 817, after the changes are implemented, the video game can be played in a multiplayer mode supporting single player storyline objectives as described with respect to FIG. 5.

Example Hardware Configuration of Computing System

Figure 9:
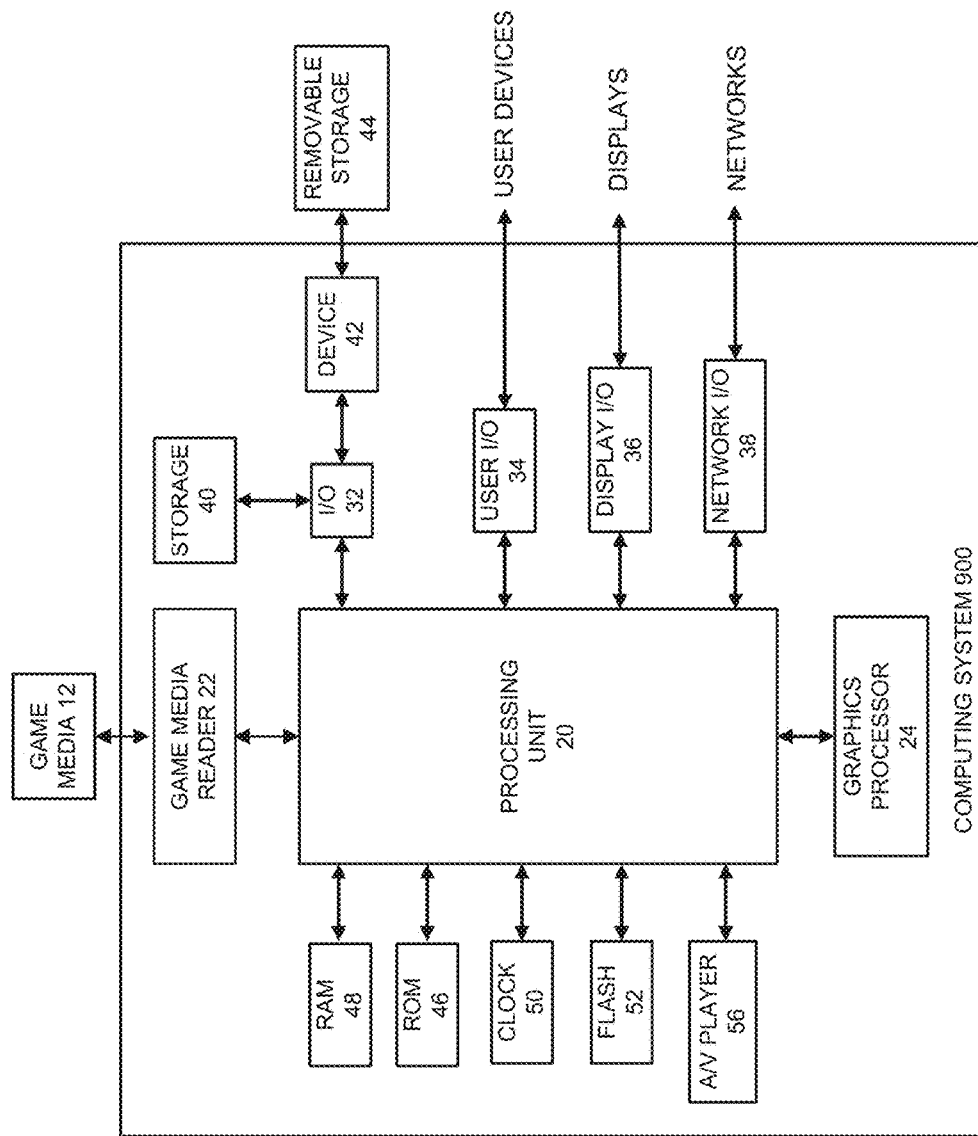
FIG. 9 illustrates an embodiment of a hardware configuration for a computing system that may implement aspects of the present disclosure.

FIG. 9 illustrates an embodiment of a hardware configuration for a computing system 900. The computing system 900 can be implemented in the computer systems 101 and 105 of FIG. 1 and/or the computer system 213 of FIG. 2. Other variations of the computing system 900 may be substituted for the examples explicitly presented herein, such as removing or adding components to the computing system 900. The computing system 900 may include a computer, a server, a smart phone, a tablet, a personal computer, a desktop, a laptop, a smart television, and the like.

As shown, the computing system 900 includes a processing unit 20 that interacts with other components of the computing system 900 and also components external to the computing system 900. A game media reader 22 may be included that can communicate with game media 12. Game media reader 22 may be an optical disc reader capable of reading optical discs, such as CD-ROM or DVDs, or any other type of reader that can receive and read data from game media 12. In some embodiments, the game media reader 22 may be optional or omitted. For example, game content or applications may be accessed over a network via the network I/O 38 rendering the game media reader 22 and/or the game media 12 optional.

The computing system 900 may include a separate graphics processor 24. In some cases, the graphics processor 24 may be built into the processing unit 20, such as with an APU. In some such cases, the graphics processor 24 may share Random Access Memory (RAM) 48 with the processing unit 20. Alternatively, or in addition, the computing system 900 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device.

The computing system 900 also includes various components for enabling input/output, such as an I/O 32, a user I/O 34, a display I/O 36, and a network I/O 38. As previously described, the input/output components may, in some cases, include touch-enabled devices. The I/O 32 can interact with storage element 40, device 42, and/or removable storage media 44 in order to provide storage for the computing system 900. The storage element 40 can store video game data including player profiles, a map library, constraint data, and other information. Processing unit 20 can communicate through I/O 32 to store data, such as game state data and any shared data files. In addition to storage 40 and removable storage media 44, the computing system 900 is also shown including ROM (Read-Only Memory) 46 and RAM 48. RAM 48 may be used for data that is accessed frequently, such as when a game is being played, or for all data that is accessed by the processing unit 20 and/or the graphics processor 24.

User I/O 34 is used to send and receive commands between processing unit 20 and user devices, such as game controllers. In some embodiments, the user I/O 34 can include touchscreen inputs. As previously described, the touchscreen can be a capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals may be produced by the display I/O 36 and can include signals for displaying visual content produced by the computing system 900 on a display device, such as graphics, user interfaces, video, and/or other visual content. The computing system 900 may comprise one or more integrated displays configured to receive display output signals produced by the display I/O 36, which may be output for display to a user. According to some embodiments, display output signals produced by the display I/O 36 may also be output to one or more display devices external to the computing system 900.

The computing system 900 can also include other features that may be used with a game, such as a clock 50, flash memory 52, and other components. An audio/video player 56 might also be used to play a video sequence, such as a movie. It should be understood that other components may be provided in the computing system 900 and that a person skilled in the art will appreciate other variations of the computing system 900.

Program code can be stored in ROM 46, RAM 48, or storage 40 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays.

As computing system 900 reads game media 12 and provides a game, information may be read from game media 12 and stored in a memory device, such as RAM 48. Additionally, data from storage 40, ROM 46, other computers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves, increases, or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, and the like, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:
   receiving a first request associated with a plurality of storyline objectives and at least a first videogame environment map of a plurality of videogame environment maps in a videogame, wherein individual video game environment maps define a spatial layout of a virtual environment in which virtual characters can interact with each other and virtual objects within in the virtual environment;
   determining a compatibility of the first videogame environment map with a plurality of storyline objectives associated with the videogame;
   identifying a first subset of storyline objectives of the plurality of storyline objectives that are compatible with the first videogame environment map;
   identifying a second subset of storyline objectives of the plurality of storyline objectives that are incompatible with the first videogame environment map, wherein individual;
   for individual storyline objectives of the second subset of storyline objectives identifying elements that are incompatible with the first videogame environment map;
   determining, using a machine learning model, one or more modifications to at least a first storyline objective of the second subset of storyline objectives; and
   modifying the first storyline objective such that it is compatible with the first videogame environment map.

2. The computer-implemented method of claim 1, further comprising:
   determining constraints of the first videogame environment map that restrict compatibility of the plurality of storyline objectives with the first videogame environment map.

3. The computer-implemented method of claim 2, further comprising:
   determining one or more modifications to one or more constraints of the first videogame environment map that increases a number of storyline objectives that are compatible with the first videogame environment map.

4. The computer-implemented method of claim 3, further comprising, wherein the constraints include lore constraints, storyline constraints, map constraints, player level constraints, resource constraints, and matchmaking rules.

5. The computer-implemented method of claim 1, further comprising:
   determining a combination of storyline objectives that is compatible with the first videogame environment map, wherein a second objective and a third objective are part of the combination of storyline objectives.

6. The computer-implemented method of claim 5, further comprising:
   determining that the second objective and the third objective are simultaneously compatible with the first videogame environment map based at least in part on:
   a first constraint associated with the second objective;
   a second constraint associated with the third objective; and
   a third constraint associated with the first videogame environment map.

7. The computer-implemented method of claim 5, wherein determining that the combination of storyline objectives is compatible with the first videogame environment map is performed using at least one of: a directed search or a compatibility database.

8. The computer-implemented method of claim 1, wherein the first request is associated with two or more of the plurality of videogame environment maps.

9. The computer-implemented method of claim 8 further comprising:
   determining whether any plurality of videogame environment maps are compatible with less than a threshold number of storyline objectives.

10. A computing system comprising:
    a memory;
    one or more data stores including computer-readable instructions; and
    one or more processors configured to execute the computer-readable instructions to perform operations comprising:
    receiving a first request associated with a plurality of storyline objectives and at least a first videogame environment map of a plurality of videogame environment maps in a videogame, wherein individual video game environment maps define a spatial layout of a virtual environment in which virtual characters can interact with each other and virtual objects within in the virtual environment;
    determining a compatibility of the first videogame environment map with a plurality of storyline objectives associated with the videogame;

identifying a first subset of storyline objectives of the plurality of storyline objectives that are compatible with the first videogame environment map;

identifying a second subset of storyline objectives of the plurality of storyline objectives that are incompatible with the first videogame environment map, wherein individual;

for individual storyline objectives of the second subset of storyline objectives identifying elements that are incompatible with the first videogame environment map;

determining, using a machine learning model, one or more modifications to at least a first storyline objective of the second subset of storyline objectives; and modifying the first storyline objective such that it is compatible with the first videogame environment map.

11. The computing system of claim 10, wherein the one or more processors are further configured to perform operations comprising:

determining constraints of the first videogame environment map that restrict compatibility of the plurality of storyline objectives with the first videogame environment map.

12. The computing system of claim 11, wherein the one or more processors are further configured to perform operations comprising:

determining one or more modifications to one or more constraints of the first videogame environment map that increases a number of storyline objectives that are compatible with the first videogame environment map.

13. The computing system of claim 12, wherein the constraints include lore constraints, storyline constraints, map constraints, player level constraints, resource constraints, and matchmaking rules.

14. The computing system of claim 10, wherein the one or more processors are further configured to perform operations comprising:

determining a combination of storyline objectives that is compatible with the first videogame environment map, wherein a second objective and a third objective are part of the combination of storyline objectives.

15. The computing system of claim 14, wherein the one or more processors are further configured to perform operations comprising:

determining that the second objective and the third objective are simultaneously compatible with the first videogame environment map based at least in part on:
a first constraint associated with the second objective;
a second constraint associated with the third objective; and
a third constraint associated with the first videogame environment map.

16. The computing system of claim 10, wherein the first request is associated with two or more of the plurality of videogame environment maps.

17. The computing system of claim 16, wherein the one or more processors are further configured to perform operations comprising:

determining whether any of the plurality of videogame environment maps are compatible with less than a threshold number of storyline objectives.

18. A non-transitory computer-readable medium storing computer-readable instructions that, when executed by a computing system, cause the computing system to perform operations comprising:

receiving a first request associated with a plurality of storyline objectives and at least a first videogame environment map of a plurality of videogame environment maps in a videogame, wherein individual video game environment maps define a spatial layout of a virtual environment in which virtual characters can interact with each other and virtual objects within in the virtual environment;

determining a compatibility of the first videogame environment map with a plurality of storyline objectives associated with the videogame;

identifying a first subset of storyline objectives of the plurality of storyline objectives that are compatible with the first videogame environment map;

identifying a second subset of storyline objectives of the plurality of storyline objectives that are incompatible with the first videogame environment map, wherein individual;

for individual storyline objectives of the second subset of storyline objectives identifying elements that are incompatible with the first videogame environment map;

determining, using a machine learning model, one or more modifications to at least a first storyline objective of the second subset of storyline objectives; and modifying the first storyline objective such that it is compatible with the first videogame environment map.

19. The non-transitory computer-readable medium of claim 18, wherein the computing system is further configured to perform operations comprising:

determining constraints of the first videogame environment map that restrict compatibility of the plurality of storyline objectives with the first videogame environment map.

20. The non-transitory computer-readable medium of claim 19, wherein the computing system is further configured to perform operations comprising:

determining one or more modifications to one or more constraints of the first videogame environment map that increases a number of storyline objectives that are compatible with the first videogame environment map.

* * * * *

UNITED STATES PATENT AND TRADEMARK OFFICE
CERTIFICATE OF CORRECTION

PATENT NO. : 12,427,428 B2  
APPLICATION NO. : 18/601602  
DATED : September 30, 2025  
INVENTOR(S) : Harold Henry Chaput et al.

Page 1 of 1

It is certified that error appears in the above-identified patent and that said Letters Patent is hereby corrected as shown below:

In the Specification

Column 17, Line 48, delete "Gather #gold or" and insert --"Gather # gold or--.

In the Claims

Column 22, Claim 9, Line 47, delete "whether any plurality" and insert --whether any of the plurality--.

Signed and Sealed this  
Tenth Day of February, 2026

John A. Squires  
*Director of the United States Patent and Trademark Office*